Patented June 14, 1938

2,120,754

UNITED STATES PATENT OFFICE 2,120,754

DISAZO DYESTUFFS AND PROCESS FOR THEIR PREPARATION

Adolf Krebser, Riehen, near Basel, Switzerland, assignor to the firm J. R. Geigy A. G., Basel, Switzerland No Drawing. Application April 20, 1937, Serial No. 138,066. In Germany April 29, 1936

8 Claims. (Cl. 260—83)

In British specification No. 24,527 of 1897 there is described the manufacture of black disazo-dyestuffs by combining a diazotized para-aminodiphenylamine sulphonic acid or a homologue thereof with α-naphthylamine and then re-diazotizing the aminoazo-compound thus produced and coupling it with a naphthol or a sulphonic acid thereof. These dyestuffs are known under the name of "Nerol" (Col. Ind. No. 304).

According to the present invention, disazo-dyestuffs with unexpected and completely new qualities are obtained when the aforesaid manufacture is modified by using 2-naphthol-4-sulphonic acid as the final azo-component instead of those commonly used, namely 2-naphthol-6-sulphonic acid and 1-naphthol-4- and -5-sulphonic acids.

The new disazo-dyestuffs are suited for dyeing wool and silk; the dyeings do not bronze, even in deep shades, a property which is of great importance to the dyer. In this respect they differ from the known dyestuffs containing isomeric naphthol-sulphonic acids as final components. This difference is very unexpected and surprising.

In addition to the new property above described, the disazo-dyestuffs of the present invention have a better affinity for wool in a neutral dye bath and are remarkably fast towards $SO_2$. They have a pronounced greenish shade which is greatly appreciated for deep black dyeings.

The following example illustrates the invention:—

28.6 kilos of the sodium salt of para-aminodiphenylamine-ortho-sulphonic acid are diazotized at 0° C. By means of 7 kilos of sodium nitrite and 32 kilos of hydrochloric acid of 30 per cent. strength. The diazonium compound which has partially separated is then added to an aqueous suspension of 18 kilos of α-naphthylamine hydrochloride containing 14.3 kilos of α-naphthylamine and the mineral acid is slowly neutralized by addition of 75 kilos of a sodium acetate solution of 20 per cent. strength. The formation of the monoazo-dyestuff is completed by addition of 8 kilos of anhydrous sodium carbonate in 30 litres of water. The product which has separated is filtered and converted into the sodium salt with the requisite quantity of caustic soda lye. After addition of a solution of 6.9 kilos of sodium nitrite, the whole is allowed to run slowly at 0–5° C. into 70 kilos of hydrochloric acid of 30 per cent. strength diluted with ice and water. The sparingly soluble blue-black diazonium compound thus formed is then added to a solution of 22.4 kilos of 2-naphthol-4-sulphonic acid maintained alkaline throughout with 25 kilos of anhydrous sodium carbonate. Stirring is continued for several hours and the dyestuff is then salted out with common salt, filtered, pressed and dried. It is a black powder which is soluble in water to a greenish-blue solution and in concentrated sulphuric acid to a greenish-grey solution.

If in the above example the para-aminodiphenylamine-ortho-sulphonic acid is replaced by an isomeric or homologous compound or by a substitution product such as para-aminophenyl para'-tolylamine-ortho-sulphonic acid, para-amino-para'-ethoxy-diphenylamine-ortho-sulphonic acid and so on, there are obtained black disazo-dyestuffs with similar properties.

What I claim is:—

1. A process of producing disazo-dyestuffs which comprises combining one mol. of a diazotized p-aminodiphenyl-amine-monosulphonic acid with 1 mol. of α-naphthylamine, diazotizing the thus produced compound and combining same with 1 mol. of 2-naphthol-4-sulphonic acid.

2. A process of producing disazo-dyestuffs which comprises combining 1 mol. of diazotized p-aminodiphenyl-amine-ortho-sulphonic acid with 1 mol. of α-naphthylamine, diazotizing the thus produced compound and combining same with 1 mol. of 2-naphthol-4-sulphonic acid.

3. A process of producing disazo-dyestuffs which comprises combining 1 mol. of diazotized p-aminophenyl-p'-tolylamine-ortho-sulphonic acid with 1 mol. of α-naphthylamine, diazotizing the thus produced compound and combining same with 1 mol. of 2-naphthol-4-sulphonic acid.

4. A process of producing disazo-dyestuffs which comprises combining 1 mol. of diazotized p-amino-p'-ethoxy-diphenylamine-ortho-sulphonic acid with 1 mol. of α-naphthylamine, diazotizing the thus produced compound and combining same with 1 mol. of 2-naphthol-4-sulphonic acid.

5. Disazodyestuffs of the formula of the dyestuff acids

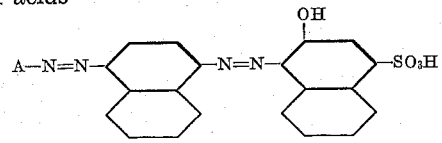

wherein A represents the radical of a p-aminodiphenylamine-sulphonic acid, said dyestuffs being black powders, soluble in water to a greenish-blue solution and dyeing wool and silk black shades which do not bronze even in deep shades.

6. The disazodyestuff of the formula of the dyestuff acid

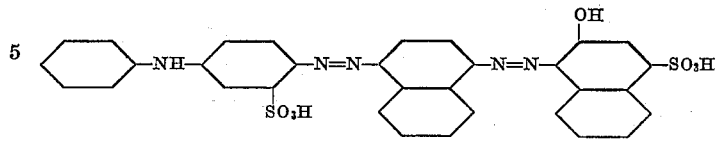

said dyestuff being a black powder soluble in water to a greenish-blue solution and in concentrated sulphuric acid to a greenish-grey solution, dyeing wool and silk black shades which do not bronze even in deep shades.

7. The disazodyestuff of the formula of the dyestuff acid

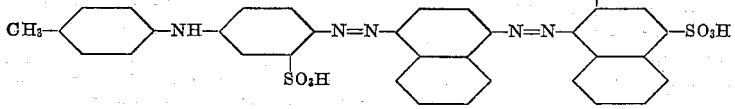

said dyestuff being a black powder soluble in water to a greenish-blue solution and in concentrated sulphuric acid to a greenish-grey solution, dyeing wool and silk black shades which do not bronze even in deep shades.

8. The disazodyestuff of the formula of the dyestuff acid

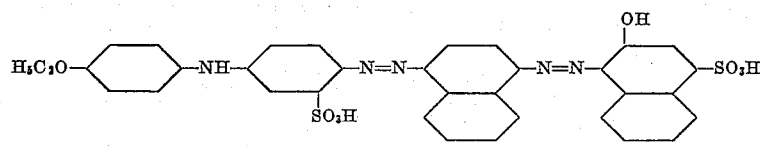

said dyestuff being a black powder soluble in water to a greenish-blue solution and in concentrated sulphuric acid to a greenish-grey solution, dyeing wool and silk black shades which do not bronze even in deep shades.

ADOLF KREBSER.